United States Patent [19]

Fukubayashi et al.

[11] Patent Number: 4,822,689
[45] Date of Patent: Apr. 18, 1989

[54] HIGH VOLUME FRACTION REFRACTORY OXIDE, THERMAL SHOCK RESISTANT COATINGS

[75] Inventors: Harold H. Fukubayashi, Ibaki; Kenichi Tsushima, Hiroshima, both of Japan; Robert C. Tucker, Jr., Brownsburg; Thomas A. Taylor, Indianapolis, both of Ind.

[73] Assignee: Union Carbide Corporation, Danbury, Conn.

[21] Appl. No.: 900,318

[22] Filed: Aug. 26, 1986

Related U.S. Application Data

[63] Continuation-in-part of Ser. No. 789,099, Oct. 18, 1986, abandoned.

[51] Int. Cl.$^4$ ............................................. B32B 15/04
[52] U.S. Cl. .................................. 428/472; 428/469; 75/252
[58] Field of Search ............... 428/564, 937, 632, 640, 428/469, 472; 75/252; 427/34, 405; 501/127, 100, 99

[56] References Cited

U.S. PATENT DOCUMENTS

| | | | |
|---|---|---|---|
| 3,006,782 | 10/1961 | Wheildon | 428/632 |
| 3,091,548 | 5/1963 | Dillon | 428/937 |
| 3,261,673 | 7/1966 | Wheildon | 428/632 |
| 3,298,936 | 1/1967 | Michael | 428/632 |
| 3,436,511 | 4/1969 | Rath | 427/34 |
| 3,440,079 | 4/1969 | Jensen | 427/34 |
| 3,597,241 | 8/1971 | Perugini | 75/252 |
| 3,719,514 | 3/1973 | Perugini | 427/34 |
| 3,751,295 | 8/1973 | Blumenthal et al. | 427/34 |
| 3,864,093 | 2/1975 | Wolfla | 428/564 |
| 3,977,660 | 8/1976 | Nakahira | 427/34 |
| 4,124,737 | 11/1978 | Wolfla et al. | 428/937 |
| 4,180,622 | 12/1979 | Burkhard et al. | 427/34 |

FOREIGN PATENT DOCUMENTS

| | | | |
|---|---|---|---|
| 156773 | 12/1981 | Japan | 427/34 |
| 64287 | 4/1983 | Japan | 427/34 |
| 2117415A | 10/1983 | United Kingdom | 427/34 |

OTHER PUBLICATIONS

"Improved Adhesion of Plasma-Sprayed Coatings to Articles", Karpinos et al., Sov. Powder Metall. & Metal. Ceram. (USA), vol. 11, No. 3 (111) (Mar. 1972), pp. 253-254.

*Primary Examiner*—John J. Zimmerman
*Attorney, Agent, or Firm*—James L. Sonntag

[57] ABSTRACT

A coating composition applied to a substrate by thermal spray process, characterized by improved wear, thermal shock resistance and chemical resistance at elevated temperatures, the coating composition containing greater than about 60 volume percent refractory oxide with the balance comprising a cobalt and/or nickel and/or iron base metal matrix containing chromium, aluminum and tantalum.

18 Claims, No Drawings

HIGH VOLUME FRACTION REFRACTORY OXIDE, THERMAL SHOCK RESISTANT COATINGS

This is a continuation-in-part of U.S. patent application Ser. No. 789,099, filed Oct. 18, 1986 now abandoned.

The present invention relates to wear and corrosion resistant coatings containing refractory oxides, such as alumina, for increased chemical inertness and having high impact and thermal shock resistance.

BACKGROUND OF THE INVENTION

There are many situations in industry today requiring a chemically inert surface which has substantial wear resistance. Alumina (aluminum oxide) is well known for its chemical inertness in many environments. However, alumina is limited in its applicability as a coating material on most metallic substrates at elevated temperatures. For example, detonation gun and plasma sprayed coatings of pure alumina have been successfully used in the food processing and textile industries at ambient temperatures where advantage can be taken of their high wear and corrosion resistance. However, when heated to moderately elevated temperatures, e.g., about 110° to 440° C., alumina coatings usually spall from most metal substrates, for example, aluminum, carbon steel, stainless steels, or titanium. Similar problems occur with other refractory oxides when used as coatings such as zirconia and chromia. This, in part, is due to the severe mismatch in thermal expansion between refractory oxides and these metals or alloys. Consequently, any advantage that might otherwise be gained from these refractory oxides coatings, namely, wear and corrosion resistance, is lost.

The tendency to spalling of alumina coatings is exacerbated by the fact that alumina upon thermal cycling may go between the alpha and gamma crystallographic phases with disruptive volumetric changes. These changes, like the mismatches in thermal expansion, can cause spalling.

A unique family of coatings containing alumina with a cobalt base matrix is disclosed in U.S. Pat. No. 4,124,737. These coatings, which contain up to 50 volume % alumina or other oxides, possess unique wear, thermal shock and impact resistance.

Unfortunately, this family of coatings does not exhibit adequate chemical inertness in all environments. For example, in those situations where metals or oxidized metals come into contact with the coating surface at elevated temperatures, e.g., above about 500° C., reactions may occur between the matrix of the coatings and the contacting metal or metal oxides. These reactions result in transient or permanent bonding, galling wear and/or pick-up on the surface of the coating.

U.S. Pat. No. 3,436,511 discloses coatings applied by arc processes which coatings consist essentially of from 20 to 40 weight percent of at least a metal taken from the group consisting of chromium, nickel and aluminum with the remainder being at least one oxide taken from the class consisting of chromia, alumina and titania. These coatings have a nodular finish and are particularly suggested for use in the textile industry to provide a wear resistant, low friction surface over which threads, filaments, yarns, etc., can be passed and for use in the aircraft industry. The Table and supporting text indicates that a chromia chromium mix containing 60 percent chromia and 40 percent chrome (approximately 75 volume percent chromia) had good wear properties above about 1000° F. but poor at room temperature. A chromia-chromium alloy containing 80 percent chromia and 20 percent chromium (approximately 90 volume percent chromia) demonstrated a higher wear rate at elevated temperatures but was better than the above mentioned chromia-chromium mix. An alumina-aluminum (approximately 75 volume percent alumina) and alumina-nickel (approximately 75 volume percent alumina) were also exemplified.

U.S. Pat. No. 3,864,093 discloses high temperature, wear resistant coatings having at least one metal oxide dispersed in a metal alloy matrix comprising (a) at least 40 percent based on the weight of the alloy of at least one of iron, cobalt and nickel and (b) between 10 and 40 percent based on the weight of the alloy of at least one of silicon, aluminum and chromium. The patent further discloses that other components such as tungsten, molybdenum, vanadium, manganese, carbon, rhenium, yttrium, lanthanum, boron, niobium, titanium, tantalum and zirconium may be present. The metal oxide is present in an amount from about 2 to 50 volume percent and may be aluminum oxide, chromium oxide, zirconium oxide as well as other metal oxides.

U.S. Pat. No. 3,597,241 discloses metallo-ceramic compositions having at least three components: 15 to 60 percent chromium, 10 to 50 percent nickel and 10 to 40 percent ceramic oxide such as alumina and stabilized zirconia. The patent discloses that it is difficult to anchor such ceramic oxides to substrates due to the thermal stresses that cause separation. The patent discloses the use of a first metallo-ceramic layer and then a ceramic overlay. A metallo-ceramic layer containing 40 percent alumina (approximately 60 volume percent), 30 percent chromium and 30 percent nickel was used in Example 5 as an intermediate layer with an alumina overlay.

The Derwent Abstract for Japanese patent application Kokai No. 156773/1981 reports a radiator body for infrared cooking applications which has been coated with a sprayed layer of metal oxide such as alumina, zirconia and chromia with the inclusion of metals in the coating being less than 10 percent. This would be expected to provide at least 95 volume percent metal oxide in the coating. The coatings are said to have excellent heat resistance, corrosion resistance, durability and performance.

U.S. Pat. No. 4,180,622 discloses wear resistant coatings for, e.g., disc brakes, made from aluminum. The coatings disclosed are cermets containing between 10 to 40 weight percent aluminum and 90 to 60 weight percent ceramic oxide such as alumina, chromia, and mixtures of alumina with one of titania, zirconia and chromia. The patent states that the amount of metal should be sufficient to provide ductility insensitivity and insensitivity to shock.

British Patent Specification No. 2,117,415A discloses a multiple layer coating having a nickel-chromium alloy first layer, a second layer having a mixture of the same alloy of the first layer and 30 to 70 weight percent aluminum oxide. A final layer alumina may be applied. The multilayer coating is said to provide a heat resistant coating having improved peeling and corrosion resistance. At page 3, lines 3 to 5, the patent discloses that the final alumina layer is required to obtain desired corrosion resistance.

Although this British Patent Specification broadly suggests the use of 30 to 70 weight percent aluminum oxide in the second layer, only a 30 weight percent alumina-containing layer (about 45 volume percent) is exemplified as being within the scope of the invention. Test No. 6, for instance, is comparative and uses as the second layer 20 parts of alloy to 80 parts of alumina (approximately 90 volume percent alumina). As can be seen from FIG. 2, significant weight loss of this coating occurs with thermal cycling which is indicative of spalling. Not only does the British Patent Specification demonstrate the cracking and spalling problems with high alumina volume fraction coatings, but it further indicates that even with lower alumina volume fraction coatings, alloys of nickel and chromium are insufficient to prevent spalling. See, for example, tests number 7 and 8 in which the second layer has 30 parts of alumina (approximately 45 volume percent) to 70 parts of a 50:50 alloy of nickel and chromium. Apparently because of the base coating layer, significant weight loss upon thermal cycling occurred which is indicative of spalling. Accordingly, the applicant in the British Patent Specification requires that, even with the lower volume fraction alumina coatings, the metal matrix be the same composition as the base coat matrix.

The British Patent Specification therefore places in question the broad assertions in prior disclosures regarding the ability to prevent spalling in high volume fraction refractory oxide coatings, in single layer coatings or even coatings having a base overlay with the alumina containing coating placed on the base overlay.

A number of workers in the field have proposed multilayer coatings in which the composition of metal oxide was gradually increased from essentially zero at the interface with the substrate to virtually 100 percent metal oxide at the surface. See, for instance, U.S. Pat. Nos., 3,091,548; 3,719,519 and 3,977,660 and Karpinos, et al., "Improving the Adhesion of Plasma-Sprayed Coatings to Articles", Poroshkovaya Metallurgiya, No. 3 (111), pp. 106–107, March, 1972 These workers tend to support the observations reported in the British Patent Specification that the solution to the problem of thermal cycle resistant, high volume fraction metal oxide coatings requires the use of base coating(s) having particularly matched bonding and thermal expansion properties.

SUMMARY OF THE INVENTION

By the present invention, high volume fraction refractory oxide coating compositions are provided that provide highly desirable resistance to spalling under thermal stress even if no base layer coat is employed.

In accordance with this invention, the coating compositions comprise from about 60 to 95, preferably, about 65 to 90, say, about 70 to 85, volume percent refractory oxide in a cobalt and/or nickel and/or iron based metal matrix which contains about 17 to 35 weight percent chromium, about 5 to 14 weight percent aluminum, about 5 to 20 weight percent tantalum; and about 0 to 3.5, often, 0.5 to 3.5, weight percent carbon. The metal matrix may also contain other components including yttrium (0 to about 2 weight percent); silicon (0 to about 2.5 weight percent); tungsten (0 to about 3 weight percent); molybdenum (0 to about 3 weight percent) and manganese (0 to about 3 weight percent).

The refractory oxide may comprise at least one of alumina, zirconia and chromia and may contain other metal oxides such as titania, ceria, magnesia, calcium oxide, and the like.

Coatings and coated articles according to the present invention are admirably suited for use in those applications requiring a high degree of chemical inertness combined with wear and thermal shock resistance. Illustrative of these applications are coatings for use on continuous casting molds for steels of various kinds, hearth rolls for carrying sheet steel through high temperature furnaces used in galvanizing, aluminizing materials, surfaces subject to fretting wear in gas turbine engines and other contact surfaces that are subjected to high temperature, especially surfaces contacting iron-containing materials at high temperatures.

DESCRIPTION OF THE PREFERRED EMBODIMENTS

The coatings of the present invention can be applied to a metal substrate using any conventional thermal spray technique. The preferred method of applying the coatings is by detonation gun (D-Gun) deposition. A typical D-Gun consists essentially of a water-cooled barrel which is several feet long with an inside diameter of about 1 inch. In operation, a mixture of oxygen and a fuel gas, e.g., acetylene, in a specified ratio (usually about 1:1) is feed into the barrel along with a charge of coating material in powder form. Gas is then ignited and the detonation wave accelerates the powder to about 2400 ft./sec. (730 m/sec.) while heating the powder close to or above its melting point. After the powder exits the barrel, a pulse of nitrogen purges the barrel and readies the system for the next detonation. The cycle is then repeated many times a second.

The D-Gun deposits a circle of coating on the substrate with each detonation. The circles of coating are about 1 inch (25 mm) in diameter and a few ten thousandths of an inch (several microns) thick. Each circle of coating is composed of many overlapping microscopic splats corresponding to the individual powder particles. The overlapping splats interlock and bond to each other and the substrate without substantially alloying at the interface thereof. The placement of the circles in the coating deposition are closely controlled to build-up a smooth coating of uniform thickness and to minimize substrate heating and establishment of residual stresses in the applied coating.

The powder used in a D-Gun to produce coatings of the present invention is chosen to achieve the particular coating composition desired using a given set of deposition parameters. Preferably, the oxygen-fuel gas mixture ratio employed in the D-Gun process is maintained at about 1:1. With this gas mixture ratio, the powder composition will ordinarily be the same as that of the coating. It is possible, however, to use other operating conditions with a D-Gun and either oxidize or carburize the coating as desired. It is also possible to adjust the powder composition to accommodate changes that may occur during deposition and still achieve the desired coating.

Alternatively, the coating of the present invention can be applied to a substrate by plasma arc spray or other thermal spray technique. In the plasma arc spray process, an electric arc is established between a non-consumable electrode and a second non-consumable electrode spaced therefrom. Gas is passed in contact with the non-consumable electrode such that it contains the arc. The arc-containing gas is constricted by a nozzle and results in a high thermal content effluent. The powders used to produce the coatings are injected into the effluent nozzle and are deposited onto the surfaces to be coated. This process, which is described in U.S. Pat. No. 2,858,411, produces a deposited coating which is sound, dense and adherent to the substrate. The applied coating also consists of irregularly shaped microscopic splats or leaves which are interlocked and bonded to one another and also to the substrate.

In those cases where the plasma arc spray process is used to apply the coatings of the present invention, the powders fed to the arc torch may also be the same composition as the applied coating. With some plasma arc or other thermal spray equipment, however, some change in composition may be expected, and, in such cases, the powder composition may be adjusted accordingly to achieve the desired coating composition according to the present invention.

Although the coatings of the present invention are preferably applied by detonation or plasma spray deposition, it is possible to employ other thermal spray techniques such as, for example, high velocity combustion spray (including hypersonic jet spray), flame spray and so called high velocity plasma spray methods (including low pressure or vacuum spray methods). Other techniques can be employed for depositing the coatings of the present invention as will readily occur to those skilled in the art.

The powder used in this invention usually consists of a mechanical mixture of two or more components. The first component is pure refractory oxide while the additional components comprise metallic alloys. Alternatively, the refractory oxide may be dispersed in a metallic matrix within each powder particle by mechanical alloying (attriting) or some other means.

The powders used in the present invention may be produced by a variety of means including sintering, casting and crushing, and atomization. A preferred method for producing the refractory oxide component is by sintering while for the metallic alloys the preferred method is by atomization using argon or other inert gas.

The composition changes that may occur during plasma or detonation gun deposition described above are due to chemical reaction. Another consideration when depositing powders which consist of mechanical mixtures of various components such as are used in the present invention is the relative deposition efficiency of the components. Differences in deposition efficiencies between components may lead to differences between the powder composition and coating composition. Knowledge of the differences in deposition efficiencies that will occur allows one to compensate for them by adjusting the proportions in the starting powder.

For most thermal spray applications, the preferred powder size will be −200 mesh (Tyler). For many plasma or detonation gun coatings, an even finer powder size, preferably −325 mesh, is used.

The refractory used in the coatings of the present invention may be in any crystallographic form since, when used in a thermal spray process, at least a portion of most refractory oxides passes through a molten state. The refractory oxide in the as-deposited coating may consist of several crystallographic phases depending on the specific cooling conditions present when coating a specific substrate. The purity of the refractory is often at least about 90 percent pure but ordinarily should be close to about 99 percent pure. Contaminants normally present in commercial grades of refractory oxides may be present and ordinarily do not affect the performance of the coating. In many instances, the refractory oxide is alumina due to its ready availability and suitable performance. Chromia and zirconia are also suitable for use as the refractory oxides. Mixtures of refractory oxides may be useful. The refractory oxides may be stabilized such as yttrium stabilized zirconia.

The metal matrix used in the coatings of the present invention may be any nickel or cobalt or iron base alloy or combinations thereof. Generally, cobalt base alloys are used. The cobalt may be present with at least one of nickel and iron in a weight ratio of cobalt to the combination of nickel and iron of about 50:1 to 1:1. The alloys, in addition to chromium, aluminum and tantalum, may contain as optional components carbon, yttrium, silicon, tungsten and manganese. Other optional components include vanadium, rare earth metals other than yttrium, hafnium, platinum or rhodium. Often the metal matrices used in accordance with the invention contain 17 to 35 weight percent chromium, 5 to 20 weight percent tantalum, 5 to 14 weight percent aluminum, 0 to 2 weight percent silicon, 0 to about 2 weight percent yttrium, 0.5 to 3.5 weight percent carbon and the balance at least one of cobalt, nickel and iron. One such alloy contains 54 weight percent cobalt, 25 weight percent chromium, 10 weight percent tantalum, 7.5 weight percent aluminum, 0.8 weight percent yttrium, 0.7 weight percent silicon and 2 weight percent carbon.

These alloys not only have hih temperature oxidation and high corrosion resistance, but also have adequate strength to provide thermal shock and impact resistance to the coatings. It will, of course, be understood that, in any given case, the matrix alloy should be tailored to the specific environment in which it is used, i.e., the matrix should be appropriately inert and non-reactive with the environment.

In order to achieve the required chemical inertness and wear resistance, coatings of the present invention should contain greater than about 60 volume percent of refractory oxide with the balance consisting essentially of the alloy matrix. Coatings containing up to about 84 volume percent alumina have been prepared and successfully tested. However, the refractory content should not exceed about 95 volume percent of the coating since otherwise the thermal shock and impact resistance of the coating may be seriously reduced.

The coatings of the present invention may be applied to almost any type of substrate, e.g., metallic substrates such as iron or steel or non-metallic substrates such as carbon, graphite or polymers, for instance. Some examples of substrate material used in various environments and admirably suited as substrates for the coatings of the present invention include, for example, steel, stainless steel, iron base alloys, nickel, nickel base alloys, cobalt, cobalt base alloys, chromium, chromium base alloys, copper, copper base alloys, refractory metals and refractory metal base alloys.

An undercoat may optionally be used between the primary outer coating of this invention and the substrate. This may be the case when the substrate is susceptible to corrosion (including oxidation) as a result of the penetration of a corrosive gas (e.g., air) through the inherent porosity of most thermal sprayed coatings. Thus, to protect the substrate, a corrosion resistant metallic alloy such as Ni—Cr or (Fe, Ni, Co)—Cr—Al—(Y, Si, Hf, Pt, Rh) may be applied as an undercoat, before the primary coating of this invention. It may be necessary to heat-treat the coated part in an inert atmosphere to seal (close the porosity) in this undercoat by a sintering mechanism before placing it in a corrosive environment.

In some situations it may be helpful to preoxidize the metallic alloy exposed on the surface of the coating before placing it in service. This prevents even the small metallic areas in the largely refractory oxide surface from reacting with materials in contact with it during service. This pre-oxidation may be preceded by a heat-treatment of the coating to reduce the porosity of the coating.

Coatings of the present invention are advantageously used on hearth rolls employed in dip galvanizing or aluminizing of sheet steel. In these processes, the sheet or strip of steel first passes through a pre-cleaning operation and then through an annealing furnace (hearth) before immersion in molten zinc or aluminum. A variety of pre cleaninq procedures are used beginning with a degreasing step and usually including electrolytic, alkaline or oxidizing or non oxidizing flame pre-cleaning. A variety of hearths may be employed. In some, the sheet is carried on horizontal rollers, driven at approximately the same speed as the sheet, through a long, horizontal furnace. In others, the sheet is looped over and under a series of rollers in essentially a vertical arrangement. The atmosphere in the furnaces is usually a mixture of nitrogen and hydrogen with a low dew point (oxygen content), intended to protect the sheet steel from oxidation. The purity of the atmosphere may vary from one section of the hearth to another, and from plant to plant. The temperatures in the hearth vary from about 1550° to over 2000° F., depending on the type of steel, the process being run, and the speed of the sheet relative to the temperature that must be achieved in the length of the furnace or hearth.

A major problem encountered in the dip galvanizing or aluminizing process is the development of nodules on the rollers in the hearth which consists of metal and/or metal oxides due to the transfer (pick-up) of material from the sheet to the rollers. These nodules grow and eventually begin to dent or even tear the sheet. This forces frequent roll changes with concomitant costs of replacement and lost production. This problem has become more severe in recent years since thinner sheets are being used, along with higher line speeds to increase productivity, and higher requirements for the finish on the steel sheet are becoming the industry standards.

Many different kinds of roll alloys and metallic or oxide coatings on the hearth rolls have been tried to prevent pick-up but with very little success. A major advance came with the development of coatings consisting of a specific cobalt based alloy with an alumina dispersion known as UCAR LCO 17, produced by Union Carbide Corporation and described in U.S. Pat. No. 4,129,787. This coating effectively prevents pick-up for extended periods of time in many hearths, but not all. When the temperature in the hearth exceeds about 1800° F. and/or an oxidizing flame-type of pre-cleaning is used, this coating ordinarily does not prevent pick-up for a long enough time to be economically worthwhile. In these cases, a superior coating is clearly required. Attempts to reduce pick-up by changing the composition in the cobalt alloy and reducing the surface roughness of the coating have been only partially successful.

From examination of pick-up on UCAR LCO-17 rolls, it is known that it initiates on metallic areas on the surface, not on the exposed alumina surfaces. Thus, it can be assumed that a coating comprised predominantly of alumina would resist pick-up to a far greater extent and would probably be successful if it had adequate thermal shock resistance.

In the past, however, it was found that as the refractory oxide content in oxide-metal structures increased, the concomitant increase in mismatch of thermal expansion between the combined structure and a metallic substrate lead to excessive shear stress at the interface causing spalling during high temperature exposure with relatively low volume fractions of oxide. Surprisingly, it has been found that the coatings of this invention survive high temperature exposure even thouqh the volume fraction of refractory oxide is very high. The reason for this unusual behavior is not yet understood.

The present invention provides coatings containing alumina which are superior to those previously employed on hearth rolls and in dip galvanizing or aluminizing of sheet steel as described above. The advantages of the present coatings will become more evident from the following examples:

EXAMPLE 1

Stainless steel specimens 30×50×4 mm of Type 304 were degreased in trichloroethane and grit blasted with 60 mesh alumina grit. They were then coated with alumina powder (greater than 99 percent pure) with a powder particle size of −325 Tyler mesh using a detonation gun. The coating was applied to a thickness of about 150 microns (0.150 mm) and then ground to a thickness of 50–100 microns (0.05–0.10 mm). These coated coupons were then heated in air in a muffle furnace to a temperature of 750° or 850° C. and were held for a period of 4 hours at temperature. They were then removed from the furnace and allowed to cool to room temperature. After cooling, virtually all of the coating had spalled from the surface of the stainless steel.

EXAMPLE 2

Stainless steel specimens similar to those in Example 1 and prepared in an identical manner were first coated with a layer of 10–20 microns (0.010–0.020 mm) with UCAR LCO-17 (90 (54Co—25Cr—10Ta—7.5Al—0.-8Y—0.7Si 2C)+10 Al$_2$O$_3$). The powder size of both components of UCAR LCO-17 was −325 mesh. The samples were then overcoated with a layer of pure alumina of the same composition and size as in Example 1, again utilizing the detonation gun. These samples were tested in a manner similar to that in Example 1. After cooling, all of the aluminum oxide had spalled off of the LCO-17 undercoat, leaving the LCO-17 intact.

The test illustrated in Examples 1 and 2 above shows that a pure alumina coating will spall from the stainless steel substrate with or without an undercoat layer.

EXAMPLE 3

Stainless steel samples of the same size as in Examples 1 and 2, but including both 304 and 310 type stainless steels, were prepared for coating by degreasing and gritblasting in the same manner as in Examples 1 and 2. In this case, coatings were made both with and without undercoats. In the case where undercoats were used, the undercoat material was UCAR LCO-17 coated to a thickness of 10–20 microns (0.010 0–0.020 mm). Overcoats of coatings made of mechanical mixtures of LCO-17 plus additional alumina, also −325 mesh, were applied to these specimens. The specimens were all ground to a final thickness of 50–75 microns of outer coating. The specific combinations of thicknesses and compositions are shown in Table I.

These specimens were tested for thermal shock resistance by heating them in air with a oxy-acetylene torch with the heat applied to the side of the specimen opposite the coating. They were rapidly heated in this manner to a temperature of about 900° C., held for a few minutes, and then quenched by immersion in water. Several cycles of heating and quenching were applied to the specimens to determine, in an accelerated manner, the effect of rapid heating and cooling on the formation of cracks or spalling of the coating. It should be noted that subcritical microcracks or fine, tight vertical cracks may be formed in these coatings either during deposition or initial exposure to high temperature, but that these fine cracks neither lead to spalling nor effectively degrade the coating's performance. The results of the testing are also shown in Table I.

TABLE I

| Designation UCAR- | Undercoat Thickness, μm | Total Coating $Al_2O_3$ Content Vol. %*** | Test Results |
|---|---|---|---|
| A (LCO-17) | — | 30 | NS* |
| B | 0 | 47 | NS-FC** |
| B | 10–20 | 47 | NS-FC |
| C | 0 | 71 | NS-FC |
| C | 10–20 | 71 | NS-FC |
| D | 0 | 84 | NS |
| D | 10–20 | 84 | NS |

*NS = no spalling
**FC = fine cracks
***$Al_2O_3$ in LCO-17 + $Al_2O_3$ additionally added It will be seen from the foregoing examples that coatings containing a high content of alumina, namely, volume percent up to at least 84 percent, in the case of Example 3 (only 16 volume percent alloy matrix), did not spall from the substrate when heated to elevated temperatures of about 900° C., whereas coatings of pure alumina showed evidence of spalling at even lower temperatures. Furthermore, even in those cases where fine cracking was observed (which is not detrimental to utility), the coatings performed satisfactorily without spalling.

It is claimed:

1. A powdered coating composition comprising about 60 to 95 volume percent refractory oxide and a metal alloy comprising about 17 to 35 weight percent chromium, about 5 to about 14 weight percent aluminum, about 5 to about 20 weight percent tantalum, 0 to about 3.5 weight percent carbon, 0 to about 2 weight percent yttrium, 0 to about 2.5 weight percent silicon, 0 to about 3 weight percent tungsten, 0 to about 3 weight percent molybdenum, 0 to about 3 weight percent manganese, and at least one metal selected from the group consisting of cobalt, nickel, and iron, the weight percentages based upon the weight of the metal alloy.

2. The powdered coating composition of claim 1 wherein the metal alloy comprises up to 30 weight percent iron, based upon the weight of the metal alloy.

3. The powdered coating composition of claim 1 wherein the metal alloy further comprises at least one member selected from the group consisting of vanadium, rare earth metals, hafnium, platinum and rhodium.

4. The powdered coating composition of claim 1 wherein the refractory oxide comprises at least one member selected from the group consisting of alumina, zirconia and chromia.

5. The powdered coating composition of claim 4 wherein the refractory oxide comprises alumina.

6. The powdered coating composition of claim 1 wherein the metal alloy comprises 0 to about 2 weight percent silicon, about 0.5 to about 3.5 weight percent carbon, based upon the weight of the metal alloy, and wherein the balance of the metal alloy is cobalt.

7. The powdered coating composition of claim 6 wherein the refractory oxide comprises alumina and the metal alloy comprises 54 weight percent cobalt, 25 weight percent chromium, 10 weight percent tantalum, 7.5 weight percent aluminum, 0.8 weight percent yttrium, 0.7 weight percent silicon and 2 weight percent carbon, based upon the weight of the metal alloy.

8. The powdered coating composition of claim 1 wherein the refractory oxide is in an amount of about 70 to 85 volume percent of the powdered coating composition.

9. The powdered coating composition of claim 1 wherein the refractory oxide is in an amount of about 65 to 90 volume percent of the powdered coating composition.

10. An article comprising a substrate and a coating upon the surface of the substrate, the coating comprising about 60 to about 95 volume percent refractory oxide and a metal alloy comprising about 17 to about 35 weight percent chromium, about 5 to about 14 weight percent aluminum, about 5 to about 20 weight percent tantalum, 0 to about 3.5 weight percent carbon, 0 to about 2 weight percent yttrium, 0 to about 2.5 weight percent silicon, 0 to about 3 weight percent tungsten, 0 to about 3 weight percent molybdenum, 0 to about 3 weight percent manganese, and at least one metal selected from the group consisting of cobalt, nickel, and iron, the weight percentages based upon the weight of the metal alloy.

11. The article of claim 10 wherein the metal alloy comprises up to 30 weight percent iron, based upon the weight of the metal alloy.

12. The article of claim 10 wherein the metal alloy further comprises at least one member selected from the group consisting of vanadium, rare earth metals, hafnium, platinum and rhodium.

13. The article of claim 10 wherein the refractory oxide comprises at least one member selected from the group consisting of alumina, zirconia and chromia.

14. The article of claim 13 wherein the refractory oxide comprises alumina.

15. The article of claim 13 wherein the metal alloy comprises 0 to about 2 weight percent silicon, about 0.5 to about 3.5 weight percent carbon, based upon the weight of the metal alloy, and wherein the balance of the metal alloy is cobalt.

16. The article of claim 15 wherein the refractory oxide comprises alumina and the metal alloy comprises 54 weight percent cobalt, 25 weight percent chromium, 10 weight percent tantalum, 7.5 weight percent aluminum, 0.8 weight percent yttrium, 0.7 weight percent silicon and 2 weight percent carbon, based upon the weight of the metal alloy.

17. The article of claim 10 wherein the refractory oxide is in an amount of about 70 to 85 volume percent of the of the coating.

18. The article of claim 10 wherein the refractory oxide is in an amount of about 65 to 90 volume percent of the coating.

* * * * *

UNITED STATES PATENT AND TRADEMARK OFFICE
CERTIFICATE OF CORRECTION

PATENT NO. : 4,822,689

DATED : April 18, 1989

INVENTOR(S) : Harold H. Fukubayashi; Kenichi Tsushima; Robert C. Tucker; Thomas A. Taylor Page 1 of 2

It is certified that error appears in the above-identified patent and that said Letters Patent is hereby corrected as shown below:

Column 1, line 68, "chromia chromium" should be hyphenated.

Column 2, line 12, "high temperature" should be hyphenated.

Column 3, line 1, "No." should be deleted.

Column 3, line 32, "alumina containing" should be hyphenated.

Column 3, line 41, "1972" should have a period after it.

Column 6, line 28, "hih" should read "high".

Column 6, line 55, "refractory metal" should be hyphenated.

UNITED STATES PATENT AND TRADEMARK OFFICE
CERTIFICATE OF CORRECTION

PATENT NO. : 4,822,689

DATED : April 18, 1989

Page 2 of 2

INVENTOR(S) : Harold H. Fukubayashi; Kenichi Tsushima; Robert C. Tucker; Thomas A. Taylor It is certified that error appears in the above-identified patent and that said Letters Patent is hereby corrected as shown below:

Column 7, line 8, "heat-treatment" should not be hyphenated.

Column 7, line 17, "pre cleaning" should be hyphenated.

Column 7, line 19, "non oxidizing" should be hyphenated.

Column 7, line 52, "LCO 17" should be hyphenated.

Column 9, line 22, "$\mu m$" should read "mm".

Column 10, line 27, "about" should be deleted.

Column 10, line 28, "about" should be deleted.

Signed and Sealed this

Twenty-eighth Day of August, 1990

Attest:

HARRY F. MANBECK, JR.

*Attesting Officer*　　　*Commissioner of Patents and Trademarks*

UNITED STATES PATENT AND TRADEMARK OFFICE
CERTIFICATE OF CORRECTION

PATENT NO. : 4,822,689

DATED : April 18, 1989

INVENTOR(S) : Fukubayashi et al

It is certified that error appears in the above-identified patent and that said Letters Patent is hereby corrected as shown below:

Column 10, line 64, claim 17, delete the second occurrence of "of the".

Signed and Sealed this

Tenth Day of March, 1992

Attest:

HARRY F. MANBECK, JR.

*Attesting Officer*      *Commissioner of Patents and Trademarks*